(12) United States Patent
Guillot et al.

(10) Patent No.: US 9,223,147 B2
(45) Date of Patent: Dec. 29, 2015

(54) SPECTACLE LENS PROVIDING OPHTHALMIC VISION AND AN ADDITIONAL VISION

(75) Inventors: Matthieu Guillot, Charenton le Pont (FR); Antoine Videmann, Charenton le Pont (FR); Benjamin Rousseau, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 1223 days.

(21) Appl. No.: 13/131,020

(22) PCT Filed: Nov. 23, 2009

(86) PCT No.: PCT/FR2009/052267
§ 371 (c)(1),
(2), (4) Date: Oct. 31, 2011

(87) PCT Pub. No.: WO2010/061115
PCT Pub. Date: Jun. 3, 2010

(65) Prior Publication Data
US 2012/0057122 A1    Mar. 8, 2012

(30) Foreign Application Priority Data

Nov. 25, 2008 (FR) ...................... 08 57979

(51) Int. Cl.
*G02C 7/02* (2006.01)
*G02B 27/01* (2006.01)
*G02C 7/08* (2006.01)

(52) U.S. Cl.
CPC ............ *G02C 7/027* (2013.01); *G02B 27/0172* (2013.01); *G02C 7/028* (2013.01); *G02C 7/086* (2013.01); *G02B 2027/011* (2013.01); *G02B 2027/0178* (2013.01)

(58) Field of Classification Search
CPC .......... G02C 7/02; G02C 7/024; G02C 7/027; G02B 2027/0178
USPC ............................ 351/159.01, 159.39, 159.4, 351/159.73–159.75; 359/630–633; 345/7–9
See application file for complete search history.

(56) References Cited

U.S. PATENT DOCUMENTS

| 6,305,800 | B1 | 10/2001 | Miller et al. | |
| 6,356,392 | B1 | 3/2002 | Spitzer | |
| 6,811,260 | B2 * | 11/2004 | Yamakaji | ................. 351/159.02 |
| 2003/0165017 | A1 | 9/2003 | Amitai | |
| 2007/0008624 | A1 * | 1/2007 | Hirayama | ..................... 359/630 |
| 2007/0091445 | A1 | 4/2007 | Amitai | |
| 2008/0273246 | A1 | 11/2008 | Moliton et al. | |
| 2009/0125137 | A1 | 5/2009 | Allione et al. | |
| 2010/0045927 | A1 | 2/2010 | Moliton et al. | |
| 2010/0079722 | A1 | 4/2010 | Guilloux et al. | |
| 2012/0154277 | A1 * | 6/2012 | Bar-Zeev et al. | ............. 345/158 |

* cited by examiner

*Primary Examiner* — Darryl J Collins
(74) *Attorney, Agent, or Firm* — Seed IP Law Group PLLC

(57) ABSTRACT

A method produces a spectacle lens that provides both ophthalmic vision and an additional type of vision. The method includes two consecutive steps consisting of calculating a rear surface and a front surface of the lens. The additional vision type corresponds to the perception of a light that is conveyed between the front and rear surfaces by an insert built into the lens. The rear surface of the glass is initially calculated to provide a correction of the additional vision type, and the front surface is calculated to correct the ophthalmic vision. The two surfaces of the glass therefore have complex shapes, which simultaneously reduce the optical aberration levels for both types of vision.

13 Claims, 11 Drawing Sheets

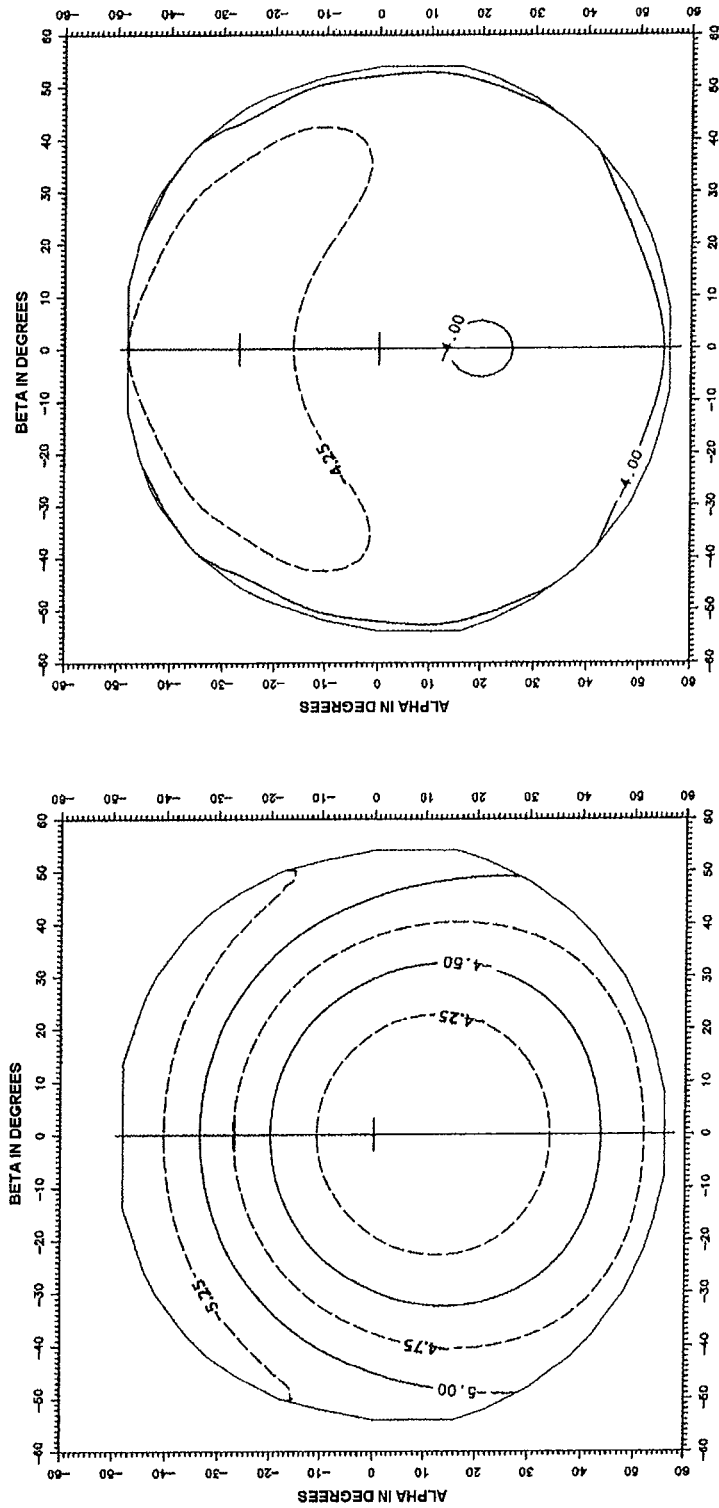

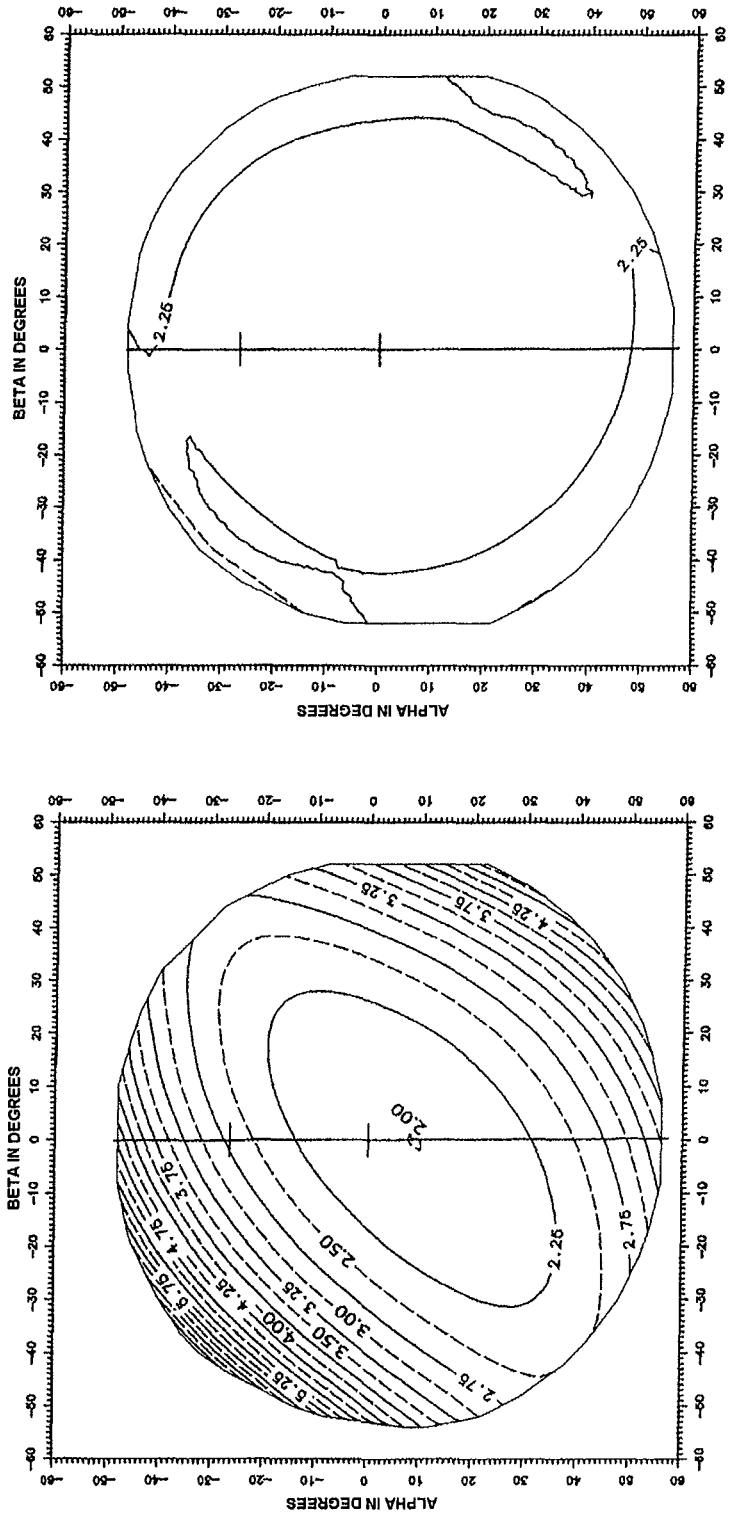

SPECTACLE LENS PROVIDING OPHTHALMIC VISION AND AN ADDITIONAL VISION

BACKGROUND

1. Technical Field

The present invention relates to a method for producing a spectacle lens which provides the wearer of this lens with at least two types of vision, including ophthalmic vision and an additional vision.

It also relates to such a spectacle lens.

2. Description of the Related Art

In the context of this description, the expression "ophthalmic vision" should be understood to mean the visible perception of the environment of a subject, such that this environment appears to him in front of him by using, if necessary, correcting or solar lenses. However, such lenses do not modify the information which is contained in the images that are thus perceived.

Unlike the ophthalmic vision, an additional vision may provide the subject with information that does not originate directly from his environment. It may be data presented to the subject. For example, navigation data which are projected overlaid on the visor of an airplane pilot's headset constitute an additional vision, of the informative vision type. An additional vision of another type may supply modified images of certain parts of the subject's environment. Thus, other examples of additional vision are the provision of an infrared image which is converted into visible light, or an image of a part of the subject's environment which is enlarged.

A spectacle lens to which the invention is applied is designed to present such additional images in the field of vision of the wearer, or in a part of this field, while retaining the ophthalmic vision. In other words, the two visions, ophthalmic and additional, are available to the wearer. They may be available simultaneously or alternately. In the case of an informative additional vision, the additional image corresponds to the visual presentation of information data. These data may appear overlaid on the ophthalmic image, notably with a light intensity which is greater or with a color which is distinct. The ophthalmic image may remain visible or not while the data of the informative additional vision are presented to the wearer.

It is known to produce such a spectacle lens which comprises:

- a front face and a rear face, the rear face facing toward the eye of the wearer for the position of use of the lens;
- a refringent medium, which is situated between these front and rear faces; and
- an insert, which is situated within the refringent medium, and which is designed to deliver, between the front and rear faces of the lens, through an output window of the insert toward the eye of the wearer, an additional light forming the additional image visible to the wearer in the position of use of the lens.

The ophthalmic vision then corresponds to the image which is formed by the light having passed in succession through the front face, a front portion of the refringent medium situated on a front side of the insert, the insert or an intermediate part of the refringent medium situated outside a peripheral edge of the insert, a rear portion of the refringent medium situated on a rear side of the insert, and the rear face of the spectacle lens. The alternation between the insert and the intermediate portion of the refringent medium, for the passage of the light for the ophthalmic vision, occurs when the insert does not occupy all the surface area of the spectacle lens which is available for the ophthalmic vision.

The additional vision corresponds to the additional image which is formed by the additional light, this additional light passing through the insert, the rear portion of the refringent medium and the rear face of the spectacle lens.

FIGS. 1a and 1b illustrate the principle of such a spectacle lens which provides the ophthalmic vision and an additional vision. It comprises a basic lens 1 within which is positioned the insert 2. The basic lens 1 consists of a transparent and refringent material, which may be any organic or mineral material used in the ophthalmic field. The basic lens 1 has a convex front face FA and a concave rear face FP. The faces FA and FP have respective curvatures which together determine, with the value of a light refractive index for the refringent medium of the basic lens 1, an optical power of the spectacle lens outside the insert 2, for the ophthalmic vision. This optical power may vary between the directions in which the wearer looks through the lens which are different.

The insert 2 may be a relatively thin light guide, which is positioned between the faces FA and FP of the basic lens 1. It may have light reflection and/or refringence characteristics which are different from those of the basic lens 1, and which are appropriate for bringing the additional light VS from a source 3 which is not represented in detail. The light VS is thus brought to an insert output window FS which faces the eye of the wearer. The structure of the insert 2 is not the subject of this description, and reference can be made to other documents available on this subject. Generally, the basic lens 1 may have a front portion 1a which is between the insert 2 and the front face FA, and a rear portion 1p which is between the insert 2 and the rear face FP. The insert 2 may also be limited transversely within an area of the basic lens 1, in certain directions approximately parallel to the faces FA and FP. In such a configuration, the front portion 1a and the rear portion 1p of the basic lens 1 extend beyond a peripheral edge 2b of the insert 2. The basic lens 1 then has an intermediate portion 1b which extends beyond the edge 2b of the insert 2, and which continually links the portions 1a and 1b to a peripheral edge B of the basic lens 1. The edge B of the basic lens 1 may, for example, be circular with a diameter of 60 mm (millimeters).

As indicated in FIG. 1b, the angular aperture of the additional vision, denoted Σ, is limited by the output window FS of the insert 2. Its pole is a center O of rotation of the eye 10 of the wearer behind the lens. Typically, the aperture Σ may be +/−15° (degree) either side of an optical axis of the additional vision, which passes through the center of the window FS. The generatrix lines of the limit of the aperture Σ intersect the rear face FP of the lens defining an area Z within this face, in which the two visions, ophthalmic and additional, are superposed. In the configuration of FIGS. 1a and 1b, the respective optical axes of the ophthalmic vision and of the additional vision are one and the same, but they may be distinct.

FIGS. 1a and 1b represent the spectacle lens in the position of use by the wearer. The eye of the wearer, referenced 10, is therefore situated behind the lens, on the side of the rear face FP so that it receives, on the one hand, light VO originating from the environment which is situated in front of the lens, and, on the other hand, the light VS which is brought by the insert 2. The light beams of the two lights VO and VS correspond respectively to the ophthalmic vision and to the additional vision. They respectively form, after having passed through the pupil 11, an ophthalmic image and an additional image on the retina 12 of the wearer. The reference 13 designates the iris of the wearer which surrounds his pupil 11. The direction in which the wearer is looking corresponds to the optical axis of the eye 10. It intersects the faces FA and FP of the spectacle lens at respective points which vary when the eye 10 turns in the orbit of the wearer.

Given that the light VO passes through the two faces FA and FP of the lens, they both contribute to optical characteristics of the lens which are relative to the ophthalmic vision. However, the light VS does not pass through the face FA, so that this face does not contribute to optical characteristics of the lens which are relative to the additional vision. Because of this difference between the lights VO and VS, they do not present convergence characteristics which are identical after they have passed through the rear face FP of the lens. For this reason, the ophthalmic and additional images which are formed on the retina are not simultaneously clear.

The expression "optical characteristics of lens which are relative to one or other of the ophthalmic and additional visions" should be understood notably to mean an optical power value, astigmatism values, optical distortion values, etc., of the lens for each direction in which the wearer looks.

The focusing difference between the additional image and the ophthalmic image on the retina 12 may be compensated by an accommodation of the eye 10 of the wearer. The document WO 2008/003903 introduces an accommodative effort limit for the wearer, when he switches from the ophthalmic vision to the additional vision. This limit of the accommodative effort depends in particular on the age of the wearer. However, the two ophthalmic and additional images nevertheless retain optical aberrations, notably when the direction of look varies through the spectacle lens and/or through the output window FS of the insert 2. In the context of the present invention, the expression "optical aberrations" should be understood to mean variations of optical power or astigmatism relative to prescribed values, or any other higher order aberration which may be characterized, notably, by the Zernike polynomials.

FIGS. 2a-2d and 3a-3d relate to spectacle lenses with two ophthalmic and additional visions, which are produced without implementing the present invention.

FIGS. 2a and 2b are respective maps of average optical power and astigmatism for a first spectacle lens, which illustrate these aberrations for the ophthalmic vision. This first lens corresponds to a myopia correction prescription of −4.00 dioptries, without astigmatism correction. The index of the refringent material of the basic lens 1 is 1.60. Each map indicates the values of the average optical power or of the astigmatism of the spectacle lens, when the direction of look varies through the lens. The x and y axes identify the angles α and β between the direction of look and a reference direction, respectively in a vertical plane and in a horizontal plane. The reference direction which is considered passes through a reference point of the spectacle lens. This reference point may notably be the mounting cross which is used to position the lens in a spectacle frame housing. Each curve in these maps links directions of look which correspond to one and the same average optical power or astigmatism value, indicated in dioptries on the curve concerned. As FIG. 2a shows, a negative average optical power difference, which reaches −1.25 dioptries, appears at the periphery of the lens for the ophthalmic vision, relative to the prescribed value produced for the reference direction (α=β=0). This difference is due to a curvature of the front face FA of the lens which is unsuited to the optical aberrations, because this curvature has been reduced to limit the accommodative effort of the wearer in additional vision mode. For the same reason, the map of FIG. 2b shows that the astigmatism increases strongly when the direction of look deviates from the reference direction, toward the periphery of the lens.

FIGS. 2c and 2d are maps of average optical power and astigmatism, which have been established again for the same first spectacle lens but for the additional vision. FIG. 2c shows in particular that the accommodative effort which has been selected is approximately −1.00 dioptry, according to the value of the average optical power for the reference direction.

In the case of such a spectacle lens for a myopic wearer, the average optical power difference is negative for the two visions (FIGS. 2a and 2c), in the peripheral area of the lens relative to the reference direction. It can therefore be compensated if necessary by an accommodation of the eye of the wearer, when he looks obliquely through the lens.

FIGS. 3a to 3d respectively correspond to FIGS. 2a to 2d for a second lens with two visions, which corresponds to a hypermetropia prescription of +2.00 dioptries, −2.00 dioptries and 135°, expressed as cylinder values according to the negative convention. The average optical power for the reference direction (α=β=0) is then approximately +1.00 dioptry (FIG. 3a). For such a hypermetropia correction, the inadequate curvature of the front face FA of the lens provokes a difference between the average optical power of the lens in the peripheral area and the value for the reference correction which is positive for the ophthalmic vision. It therefore opposes the accommodation faculty of the eye, and the resulting ophthalmic constraint is then very significant. Moreover, the accommodative effort of this second lens for the additional vision is approximately −2.25 dioptries (FIGS. 3a and 3c).

FIGS. 2a to 2d and 3a to 3d therefore show that the optical aberrations of the two lens reduce the field of the ophthalmic vision and that of the additional vision in both horizontal and vertical planes. This reduction is particularly detrimental for the ophthalmic vision, notably when the dimensions of the housing of the lens in the spectacle frame are great. The reduction of the field of the additional vision also prevents the use of inserts with wide output window.

BRIEF SUMMARY

The aim of the present invention is then to provide a spectacle lens which is designed to provide the wearer with both visions, and for which the abovementioned drawbacks are reduced.

In particular, one aim of the invention consists in increasing the fields of vision of such a spectacle lens, for the ophthalmic vision and for the additional vision.

For this, the invention proposes a method for producing a spectacle lens with at least two types of vision as described previously, which comprises the following successive steps:

/1/ obtaining an ophthalmic prescription for the wearer of the lens;

/2/ determining an additional prescription for said additional vision from the ophthalmic prescription and from a position of the additional image;

/3/ determining at least one curvature value for the rear face of the lens corresponding to the prescription determined in the step /2/, at an additional prescription point;

/4/ determining at least one curvature value for the front face of the lens at an ophthalmic prescription point, according to the prescription obtained in the step /1/ and the curvature value of the rear face of the lens determined in the step /3/;

/5/ calculating values of the rear face of the lens, at least inside an area (Z) of said rear face corresponding to an output window of the insert, designed so that said rear face area produces a correction for the additional vision which corresponds to the prescription determined in the step /2/;

/6/ calculating values for the front face of the lens, designed so that said lens produces a correction for the ophthalmic vision which corresponds to the prescription obtained in the step /1/, when the rear face of the lens has the values calculated in the step /5/; and /7/ producing the spectacle lens with the values for the front and rear faces calculated respectively in the steps /5/ and /6/.

Thus, a spectacle lens according to the invention simultaneously provides the ophthalmic vision and an additional vision, with respective optical characteristics which are adapted so that these two visions are simultaneously perceived clearly by the wearer. In other words, the lens has two ophthalmic power values, respectively for the ophthalmic vision and for the additional vision, which are adapted to the wearer for the directions of look which pass through the corresponding prescription points.

Furthermore, the two visions are perceived clearly not only for these directions which pass through the prescription points, but also for directions of look which pass outside these points. In other words, the lens provides fields of vision which are wide, both for the ophthalmic vision and for the additional vision. Notably, the field of vision or the additional vision may entirely contain the output window of the insert. The vision comfort that is obtained for the wearer for the two visions is then enhanced.

According to particular implementations of the steps /5/ and /6/ of the method according to the invention, and which may advantageously be combined, the values of the rear face of the spectacle lens, on the one hand, and those of the front face of the lens, on the other hand, may be calculated by digital optimization.

According to a refinement of the invention, when the rear face of the lens is calculated by optimization in the step /5/, its calculation may be performed differently in an area of this face which corresponds to the output window of the insert, and in a residual area of the rear face. In this case, the values of the rear face within the area which corresponds to the output window of the insert are again determined to optimize the optical characteristics of the lens for the additional vision. However, the values of the rear face in the residual area are determined according to this refinement to optimize the optical characteristics of the lens for the ophthalmic vision. The spectacle lens which is thus produced provides the wearer with a visual field for the ophthalmic vision which is greater still.

The invention also proposes a spectacle lens which provides at least two visions, the ophthalmic vision and an additional vision, as is known from the prior art, but which is characterized in that its two faces, front and rear, have complex shapes.

Such a lens may be produced by using a method according to the invention.

BRIEF DESCRIPTION OF THE SEVERAL VIEWS OF THE DRAWINGS

Other particular features and advantages of the present invention will become apparent from the following description of non-limiting implementations, with reference to the appended drawings, in which:

FIGS. 2a and 2b, already described, are maps of average optical power and astigmatism, respectively, for a first spectacle lens conforming to FIGS. 1a and 1b and for the ophthalmic vision;

FIGS. 3a to 3d, already described, respectively correspond to FIGS. 2a to 2d, for a second spectacle lens conforming to FIGS. 1a and 1b;

FIGS. 6a to 6d and 7a to 7d respectively correspond to FIGS. 2a to 2d and 3a to 3b by using the invention.

DETAILED DESCRIPTION

In the description that follows, the general knowledge of the ophthalmic field is not reviewed in detail. Such is the case, notably, with the Tscherning bases which are adapted to reduce the optical aberrations outside the prescription point. The same applies for the digital methods for optimization of the ophthalmic lenses, which have been commonly used for a number of years. The same also applies for the machining method which is used to manufacture the spectacle lens.

Figure 1A:
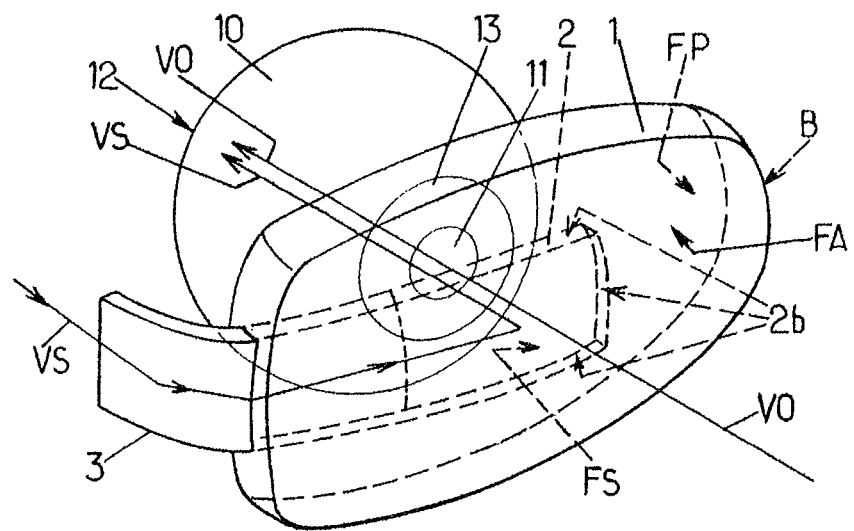
FIGS. 1a and 1b, already described, are two views of a spectacle lens providing two visions as known from the prior art, respectively in perspective and from above.
Figure 1B:
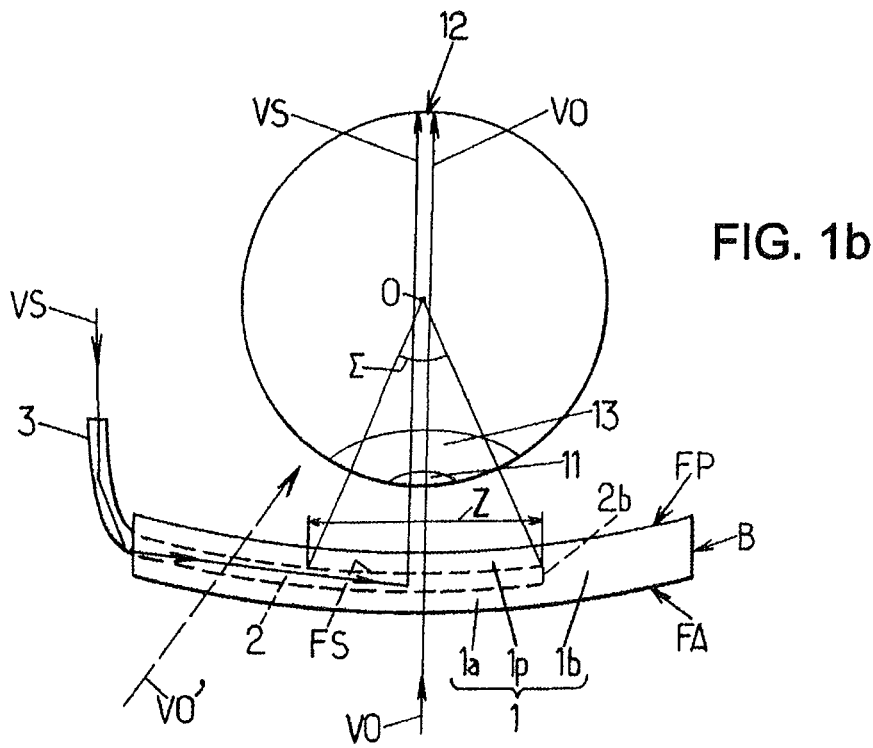

The invention consists in producing a spectacle lens which conforms to FIGS. 1a and 1b by first calculating respective shapes for the rear face FP then for the front face FA. The final lens is then produced by machining a rough cut of the basic lens 1 which incorporates the insert 2. This blank is machined on its two faces FP and FA, according to the shapes that have been calculated for each of them, and which are complex shapes. As is known, a face has two curvature values at each of its points, which are maximum and minimum respectively in two mutually perpendicular directions passing through the point concerned. The expression "face with complex shape" should be understood to mean a face of the lens of which at least one of the curvature values varies continually between points of this face which are different. A complex face therefore has no steps or discontinuities of curvature within areas of this face. The contribution of a face of the spectacle lens to the average optical power of the lens for a direction of look is given by:

$$P_A = (n-1) \times (C_{Amax} + C_{Amin})/2 \quad (1a)$$

$$P_P = (1-n) \times (C_{Pmax} + C_{Pmin})/2 \quad (1b)$$

in which $P_A/P_P$ designates the contribution of the front face FA/rear face FP, n is the index of the refringent medium which constitutes the basic lens 1 at the level of this face, and $C_{A\,max}/C_{P\,max}$ and $C_{A\,min}/C_{P\,min}$ are maximum and minimum curvatures of the face FA/FP at its point of intersection with the direction of look.

There now follows a description of a first phase of a method according to the invention, which culminates in a determination of the curvature of the front face FA of the spectacle lens at the ophthalmic prescription point. In the jargon of those skilled in the art, this first phase is called basic cutting. It is used to select the blank of the lens from a range of blanks which have variable curvatures at the ophthalmic prescription point. Usually, the blank is selected according to the ophthalmic prescription which is established for the wearer, according to a compromise between optical aberrations of the spectacle lens which are reduced and a curvature of the face FA which is limited for the aesthetic appearance of the lens.

For the invention, this basic cutting phase has two additional aims. On the one hand, the curvature of the front face FA must be compatible with the positioning of the insert 2 within the basic lens 1, without the basic lens being too thick.

Also, it must culminate in an accommodative effort which is compatible with good visual comfort, during transitions of the look of the wearer between the ophthalmic image and the additional image.

In the spectacle lens which is finally produced, the ophthalmic correction results from the shapes of the two faces FA and FP. However, the correction which is produced by the lens for the additional vision, called additional correction, is produced only for the rear face FP. For this reason, the eye of the wearer may produce an accommodation when it switches from the ophthalmic vision through the spectacle lens to the additional vision. The scale of this accommodation is called accommodative effort. It results essentially from the shape of the front face FA of the lens and the position of the additional image as is produced by the insert 2. If this additional image is situated at a great distance in front of the lens, being virtual, and if it is accepted that the average optical power of the lens for the ophthalmic vision can be estimated approximately by adding together the algebraic contributions of the two faces FA and FP of the lens, then the accommodative effort can be estimated approximately by subtracting the algebraic contribution of the rear face FP of the lens from the average optical power of the spectacle lens for the ophthalmic vision.

There is first obtained an ophthalmic correction which is prescribed for the wearer of the lens, according to his ametropia. This ophthalmic correction can be determined in the usual way, and relates to the ophthalmic vision of the wearer through the spectacle lens. It comprises, in the usual manner, several values which determine an average optical power and an astigmatism correction. The ophthalmic correction is established for a point of the front face of the lens which is called ophthalmic prescription point. This ophthalmic prescription point generally corresponds to a direction of look straight in front of the wearer. In this case, it may be combined with the mounting cross which is used to position the lens in a spectacle frame housing. For the present invention, the ophthalmic prescription point can also define a direction of look through the lens, which is central in the ophthalmic field of vision.

A value is then set for the accommodative effort, notably according to the age of the wearer. This value should generally be negative. It depends on the position of the additional image as is produced by the additional light VS just after the output window FS of the insert 2. A prescription for the additional vision is then deduced for the wearer. This is called additional prescription. When the additional image which is produced by the insert 2 is situated at a great distance in front of the spectacle lens, typically at a distance greater than 2 m (meter), the additional prescription is equal to the sum of the ophthalmic prescription and of the accommodative effort.

Preferably, the additional prescription is determined so that the accommodative effort of the wearer is less than 2.25 dioptries as an absolute value.

The astigmatism values of the additional prescription may be identical to those of the ophthalmic prescription.

The curvature of the rear face FP of the lens is then determined, notably from the additional prescription. It is thus determined for a reference point of the face FP, which is called additional prescription point. This additional prescription point may correspond to the direction of look of the wearer which passes through the middle of the output face FS of the insert 2. Generally, the additional prescription point may be distinct from the ophthalmic prescription point. Such is the case, notably, when the output window FS of the insert 2 is offset laterally and/or toward the top of the spectacle lens, relative to the mounting cross of the lens. As a first approximation, the following relation can be used to calculate the curvature Cp of the face FP at the additional prescription point:

$$C_P = PS/(1-n) \quad (2)$$

in which PS is the additional prescription. The value of Cp is negative, meaning that the face FP of the lens is concave. In fact, when the ophthalmic prescription includes an astigmatism correction, the relation (1) is applied for each of the two perpendicular directions which are indicated by the prescription, in order to obtain two curvature values, respectively maximum and minimum.

The curvature $C_A$ of the front face FA of the lens at the ophthalmic prescription point can then be determined, for example by using the following relation:

$$C_A = PO/(n-1) + C_P \quad (3)$$

in which PO is the ophthalmic prescription which was initially obtained for the wearer. According to usual practice, the astigmatism correction can be introduced only via the rear face FP, so that the front face FA is spherical at the additional prescription point. The basic value B of the face FA is then given by the relation:

$$B = (n-1) \times C_A \quad (4)$$

Preferably, this basic value B is less than or equal to 2.25 dioptries, when it is established for a refractive index n of the refringent medium which is equal to 1.60. In this way, the curvature of the face FA of the spectacle lens is compatible with the shapes of most of the inserts 2, while retaining a good aesthetic appearance. Furthermore, the accommodative effort of the wearer is simultaneously limited, so that the wearer switches comfortably from the ophthalmic vision to the additional vision.

Figure 4:
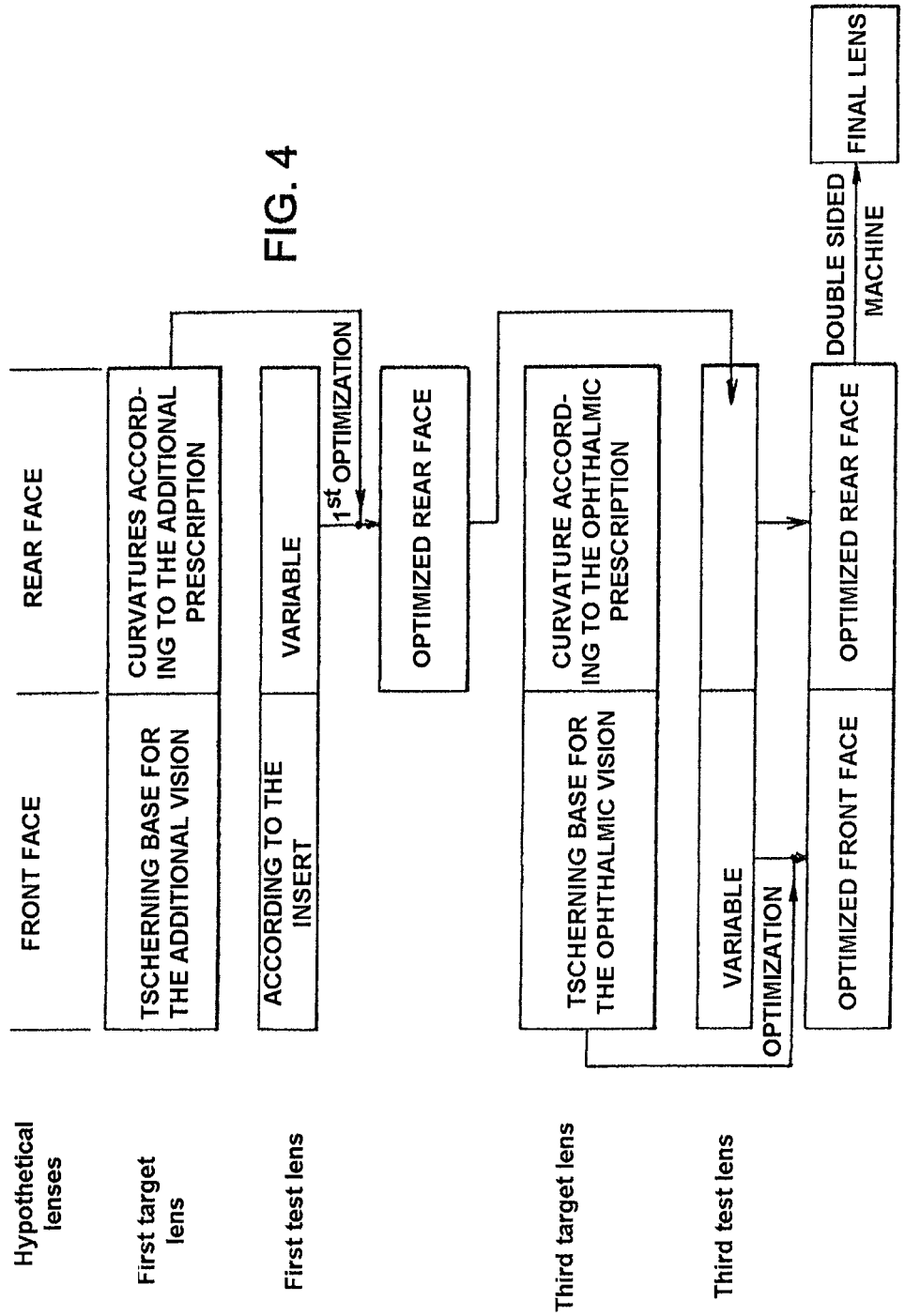
FIG. 4 is a block diagram of the steps of a method according to the invention.

The basic value which is thus obtained for the front face FA of the basic lens 1 does not generally correspond to the value which is optimal to reduce the optical aberrations of the lens. In particular, a lens with spherical faces FA and FP, respectively with the curvature values $C_A$ and $C_P$, would have significant variations in the optical power relative to the ophthalmic and additional prescriptions, for directions of look that do not pass through the corresponding prescription points. For this reason, the rear face FP of the lens is calculated in a second phase of a method according to the invention, in order to reduce optical aberrations of the additional vision. The front face FA is then calculated, in a third phase of the method, to reduce optical aberrations of the ophthalmic vision. The various steps of these two phases are indicated in FIG. 4.

The second phase of the method, when it involves a digital optimization, begins with the construction of a first target hypothetical lens. This is a known lens which corresponds to the additional prescription and which is taken for reference because it presents optical aberrations that are particularly reduced. In particular, its average optical power varies little relative to the prescription value for the directions of look which do not pass through the ophthalmic prescription point. Similarly, it has astigmatism values—amplitude and orientation of the astigmatism axis—at any point which is close to the prescribed values. The other optical aberrations of the first target hypothetical lens also have amplitudes which are low.

Thus, the first target hypothetical lens may consist of the refringent medium of the basic lens 1, and may comprise:

a hypothetical front face, which has a first basic value at the additional prescription point, this first basic value being selected to reduce optical aberrations of the additional vision relative to the additional prescription; and a hypothetical rear face, which is designed to produce, at the additional prescription point, in combination with the hypothetical front face of this first target hypothetical lens, a correction of the additional vision conforming to the additional prescription.

For example, the front face of the first target hypothetical lens may have the basic Tscherning value which is associated with the additional prescription. Its rear face may then be spherical or toric, with curvatures that are uniform and that produce an optical correction corresponding to the additional prescription, for the additional light.

A first test hypothetical lens is also constructed, which itself comprises:
 a hypothetical front face, which is defined according to the insert 2;
 the insert 2 itself;
 the rear portion 1$p$ of the refringent material; and
 a complex rear face, which is variable.

The front face of the first test hypothetical lens can be determined in a number of ways, according to the flat or curved shape of the insert 2, its thickness, its refringence characteristics and the position of the additional image. It is defined so as to take account of the position of the additional image which is produced by the rays originating from the insert 2 which are propagated in the portion 1$p$ of the refringent material.

The rear face of the first test hypothetical lens may initially have, at any point of this face, at least on the area Z which corresponds to the output window FS of the insert 2, the curvature value or values that was or were determined above for the additional prescription point. In this case, the first test hypothetical lens has curvatures that are uniform at least in the area Z.

A first optimization is then carried out, so that the first test hypothetical lens and the first target hypothetical lens have optical characteristics that are substantially equal at least within the area Z. During this first optimization, the front face of the first test hypothetical lens is set. The optimization can be performed, as is known, by reducing the value of a merit function which quantifies the differences between the respective optical characteristics of the first target hypothetical lens and those of the first test hypothetical lens, for the points of a mesh defined for these hypothetical lenses. The result of the optimization consists of the values of the rear face of the first test hypothetical lens at the points of the mesh. These values are then assigned to the rear face FP of the spectacle lens. If necessary, they may be converted at this point in the method. For example, the values of the rear face of the first test hypothetical lens may be curvature values, and they are converted into sagittal values for the spectacle lens. The rear face FP of the lens which is thus determined has a shape which is complex.

If necessary, the values of the rear face FP of the spectacle lens may then be adjusted during an additional step of the method. This adjustment may compensate for a first modification of a distance between the faces FA and FP, which is intended to provide a margin between the insert 2 and the face FP of the spectacle lens. This margin may be situated between a central point of the rear face of the insert 2 and the face FP of the spectacle lens. As is known, such an adjustment consists in adding a toric component to the values of the face FP.

According to a refinement of the invention, the rear face FP of the spectacle lens can be calculated in the manner just described only within the area Z which corresponds to the output window FS of the insert 2.

This refinement is above all advantageous when the two respective optical axes of the ophthalmic vision and of the additional vision are distinct. In FIG. 1$a$, the references VO and VO' respectively designate two rays of the ophthalmic light, the first of which passes through the insert 2 and the second of which passes outside the area Z. The present refinement makes it possible to calculate the rear face FP of the spectacle lens for the ray VS of the additional vision, and for the ray VO' of the ophthalmic vision.

The first optimization which has been described above is then limited to the interior of the area Z. Given that the area Z is smaller than the rear face FP, the first optimization may culminate in a greater reduction of the optical aberrations within this area.

In this case, and in a manner that is then optional, the rear face FP can be calculated outside the area Z by performing a second optimization, to reduce the optical aberrations for the ophthalmic vision.

For this, a second target hypothetical lens is constructed, which consists of the refringent medium and which comprises:
 a hypothetical front face, which has a second basic value at the ophthalmic prescription point, this second basic value being selected to reduce optical aberrations of the ophthalmic vision relative to the ophthalmic prescription; and
 a hypothetical rear face, which is designed to produce, at the ophthalmic prescription point, in combination with the hypothetical front face of the second target hypothetical lens, a correction of the ophthalmic vision conforming to the ophthalmic prescription.

In other words, the second target hypothetical lens is a reference lens which corresponds to the ophthalmic prescription. For example, its front face may have the basic Tscherning value which is associated with this ophthalmic prescription. Its rear face may then be spherical or toric with curvatures that are uniform and which produce a correction corresponding to the ophthalmic prescription, for the ophthalmic light.

A second test hypothetical lens, which is defined outside the area Z, itself comprises:
 a hypothetical front face which has, at the ophthalmic prescription point, the curvature value that was determined previously;
 the front portion of the refringent medium 1$a$;
 the intermediate portion 1$b$ of the refringent medium or the insert 2;
 the rear portion of the refringent medium 1$p$; and
 a complex rear face, which is variable.

The front face of the second test hypothetical lens may have a curvature which is uniform over its entire extent. It is set during the optimization of the second test hypothetical lens.

If necessary, the rear face of the second test hypothetical lens may also initially have, before optimization and outside the area Z, uniform curvature values. These may be determined so that the second test hypothetical lens produces, at the ophthalmic prescription point, an optical correction for the ophthalmic vision which corresponds to the ophthalmic prescription.

The optimization algorithm that is used for the second test hypothetical lens may be similar to that used previously for the first test hypothetical lens.

Figure 5:
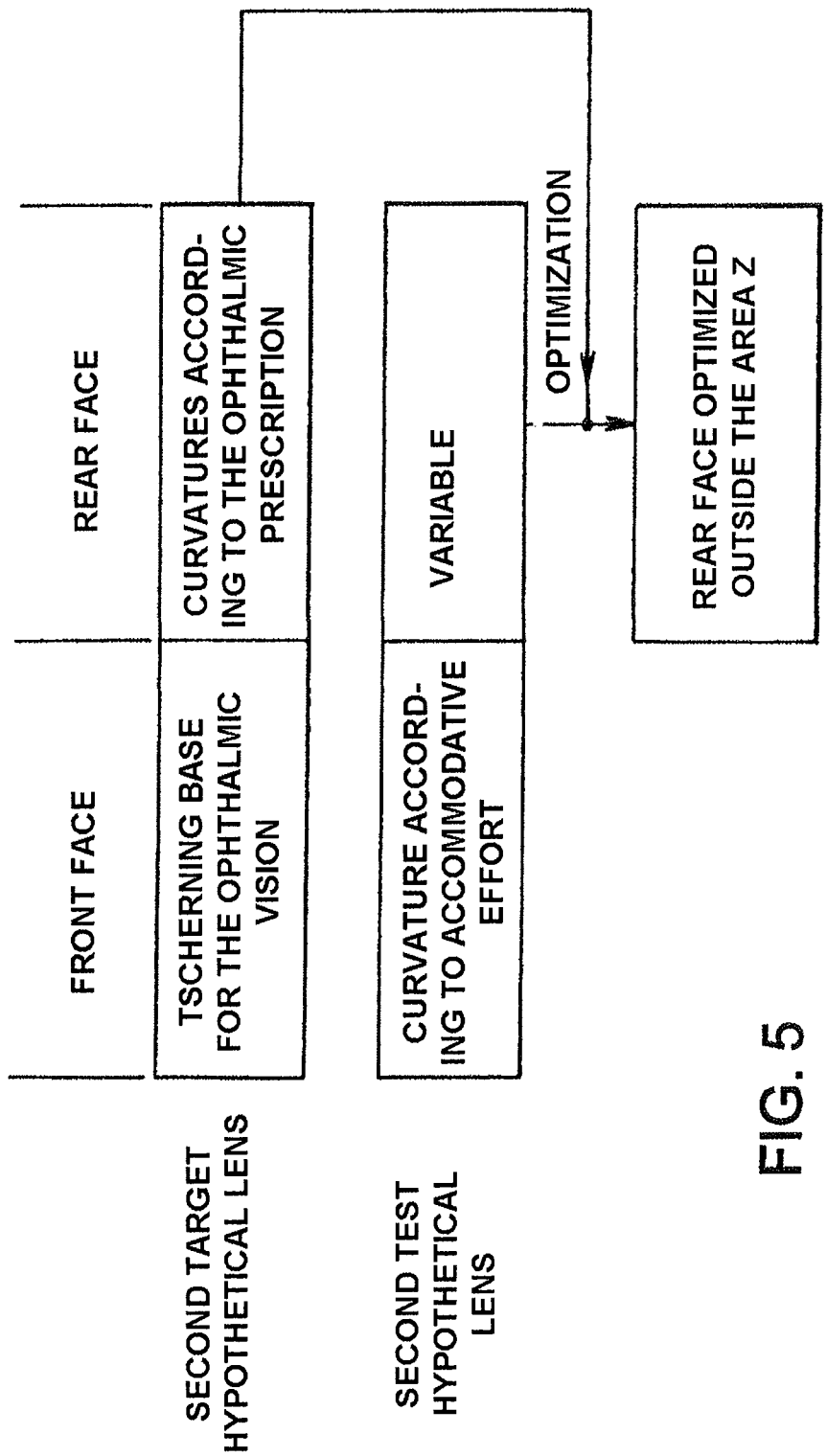
FIG. 5 is a complementary block diagram, for a refinement of the invention.

FIG. 5 illustrates this additional optimization of the refinement of the invention. The second test hypothetical lens is optimized so that it has, outside the area Z, optical characteristics which are substantially equal to those of the second target hypothetical lens. Outside the area Z, the values of the rear face of the spectacle lens are then obtained from those optimized for the rear face of the second test hypothetical lens. In this case, the rear face FP of the spectacle lens is reconstructed from the values resulting from the first optimization within the area Z, and from the values resulting from the second optimization outside the area Z. If necessary, constraints of continuity of the rear face FP at the limit of the area Z may be introduced into the second optimization.

When the first optimization has been limited within the area Z and the second optimization that has just been described has not been performed, the rear face FP of the spectacle lens combines the values which result from the first optimization within the area Z with the initial values of the rear face of the first target hypothetical lens outside the area Z.

In the third phase of the method, the front face FA of the final lens is calculated to minimize the optical aberration of the ophthalmic vision of the wearer. Referring again to FIG. 4, a third target hypothetical lens is now constructed, which consists of the refringent medium of the basic lens 1 and which comprises:

a hypothetical front face, which has a third basic value at the ophthalmic prescription point, the third basic value being selected to reduce optical aberrations of the ophthalmic vision relative to the ophthalmic prescription; and a hypothetical rear face, which is designed to produce, at the ophthalmic prescription point, in combination with the hypothetical front face of this third target hypothetical lens, a correction of the ophthalmic vision conforming to the ophthalmic prescription.

The third target hypothetical lens may therefore be identical to the second target hypothetical lens that was created previously in the refinement.

A third test hypothetical lens comprises:
a complex front face, which is variable;
the front portion of the refringent medium 1a;
the intermediate portion of the refringent medium 1b or the insert 2, depending on whether the ray concerned passes through the insert 2 or not;
the rear portion of the refringent medium 1p; and
the rear face that was obtained for the spectacle lens on completion of the second phase of the method.

The front portion of the third test hypothetical lens may additionally have, before optimization and at any point of this face, the curvature value that was determined previously for the ophthalmic prescription point.

A last optimization is then carried out, so that the third test hypothetical lens and the third target hypothetical lens have optical characteristics that are substantially equal. This last optimization may also use an algorithm which is similar to that of the first optimization. However, the rear face of the third test hypothetical lens is now set, and the front face is variable. Furthermore, the insert 2 or the intermediate portion 1b of the refringent medium is taken into account according to whether the ray concerned passes through the insert or not (ray VO vs ray VO' in FIG. 1b).

At the end of the optimization, the values that are obtained for the front face of the third test hypothetical lens are assigned to the front face FA of the spectacle lens. If necessary, they may also be converted at this point. For example, the values of the front face of the third test hypothetical lens may be curvature values, and they are converted into sagittal values for the same face. Generally, the front face FA of the spectacle lens which is calculated in this way also has a shape which is complex.

If necessary, the values thus obtained for the front face of the spectacle lens may be adjusted at this point in the method, during an additional step. Such an adjustment may compensate for a second modification of the distance between the faces FA and FP. In this way, a predetermined margin can be introduced between the edge 2b of the insert 2 and the face FA. Such an adjustment consists in adding a toric component to the curvatures calculated for the face FA in the third phase of the method.

In a fourth and final phase of the method, the spectacle lens is produced by machining the blank of the basic lens 1 which incorporates the insert 2. This blank is machined on both faces FP and FA. The face FP is machined in accordance with the rear face calculated in the second phase of the method, and the face FA is machined in accordance with the front face calculated in the third phase. Preferably, this machining is numerically controlled on the basis of the calculated values.

For reasons of simplicity, but without in any way imposing a limitation, the additional prescription point has been chosen to be the same as the ophthalmic prescription point for all the lenses of the maps presented in the appendix.

Figure 6B:
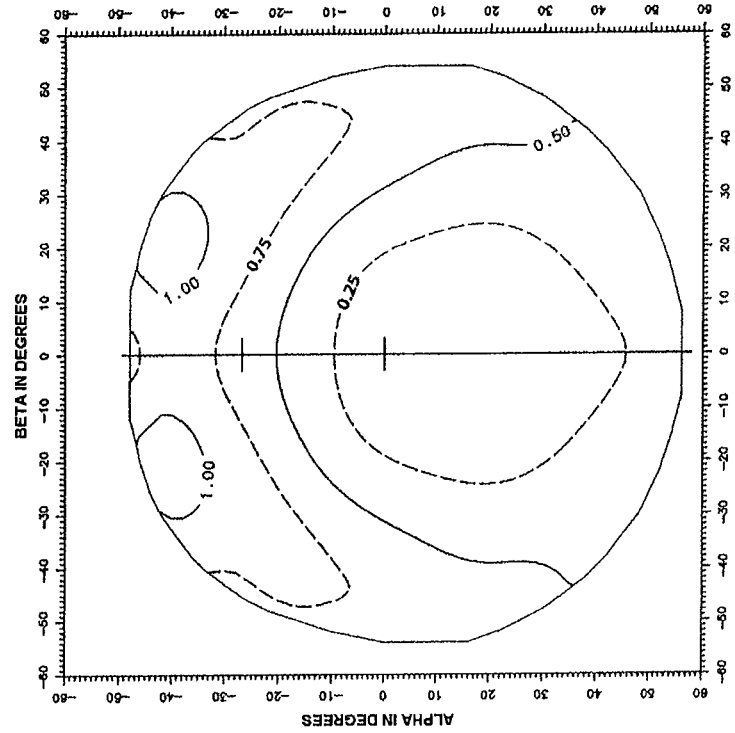
Figure 2B:
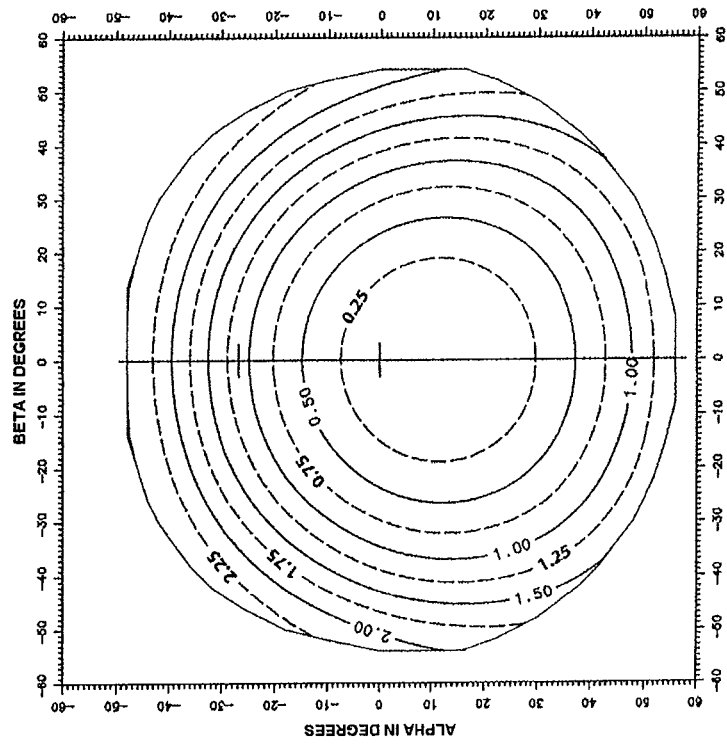
Figure 6C:
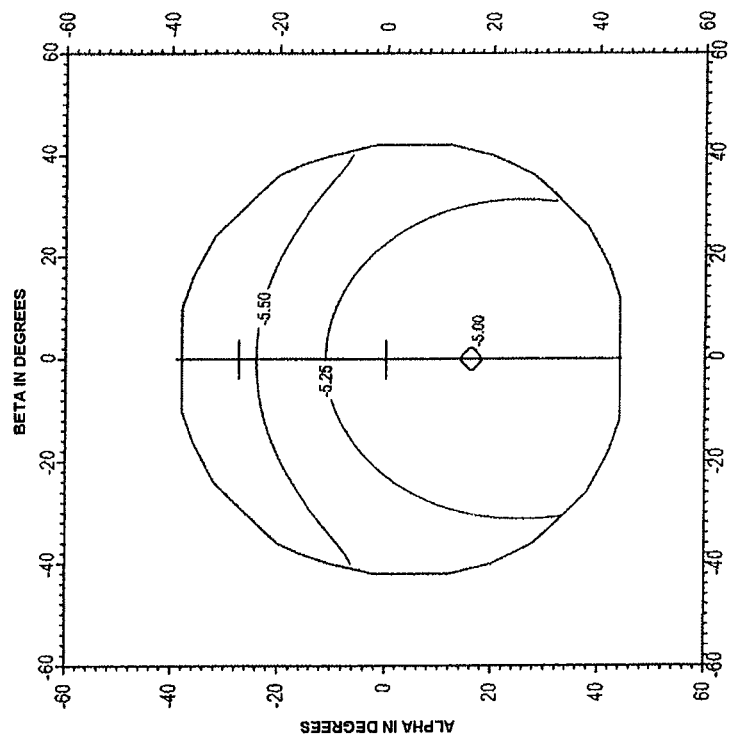
Figure 2C:
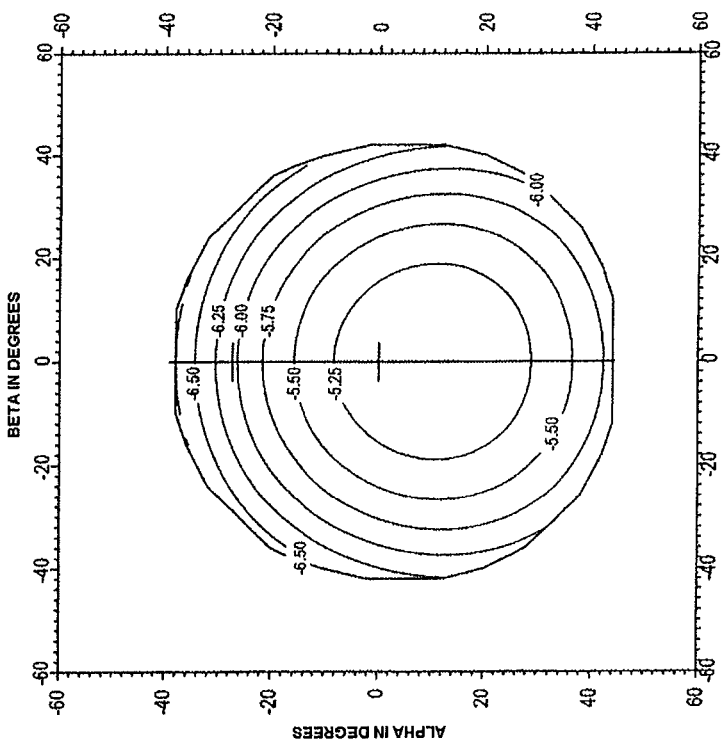
FIGS. 2c and 2d, already described, are maps of average optical power and astigmatism, respectively, for the first lens of FIGS. 2a and 2b and for the additional vision.
Figure 2D:
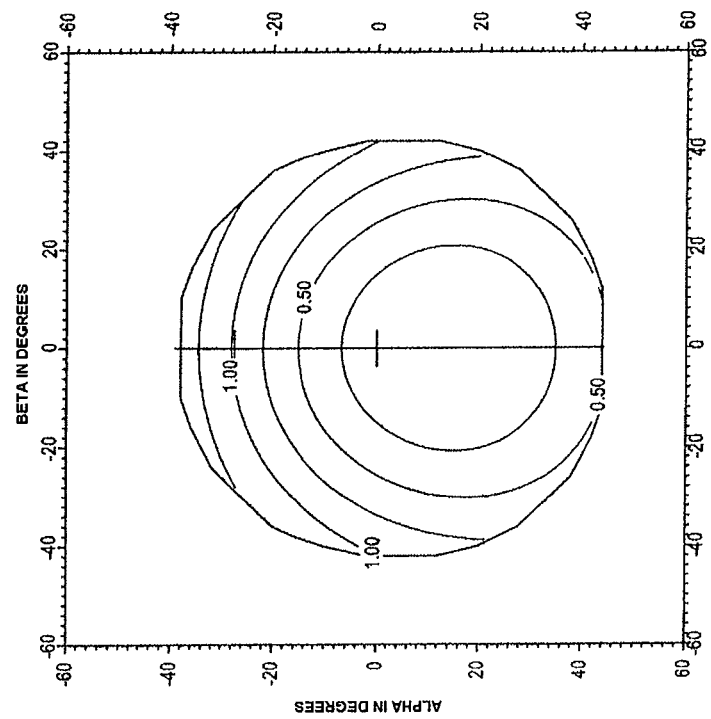
Figure 6D:
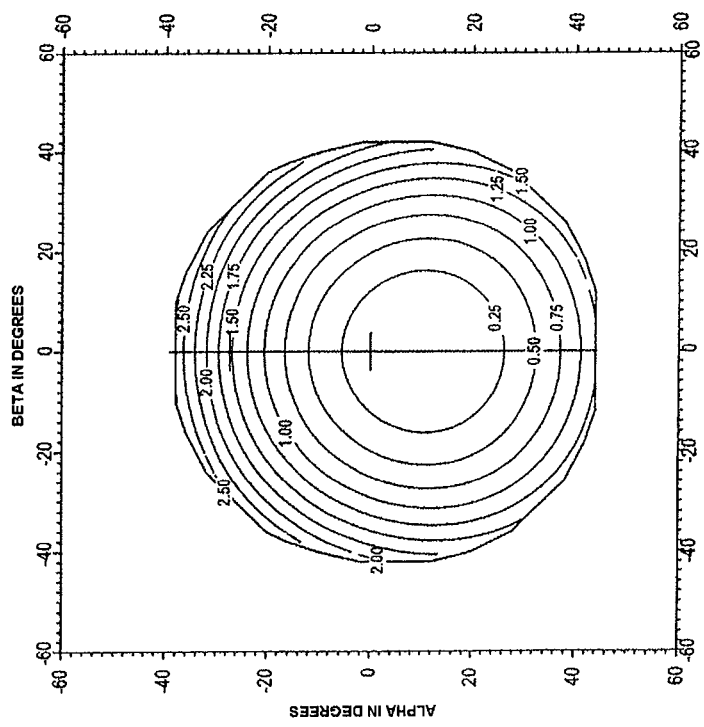

FIGS. 6a to 6d are maps of a lens produced according to the invention, called third lens, which corresponds to the same ophthalmic prescription as the first lens of FIGS. 2a to 2d. FIGS. 6a and 6b respectively relate to the average optical power and the astigmatism for the ophthalmic vision, and FIGS. 6c and 6d respectively relate to the average optical power and astigmatism for the additional vision. According to FIG. 6a, the optical power for the ophthalmic vision exhibits variations which are less than 0.5 dioptry relative to the ophthalmic prescription point over the entire lens. By way of comparison, this variation is greater than 1.0 dioptry as an absolute value for the first lens (FIG. 2a) between the ophthalmic prescription point and the periphery of the lens in the horizontal plane. Simultaneously, the comparison of FIGS. 2b and 6b shows that the width of the ophthalmic field of vision in the horizontal plane has changed from +/−26° for the first lens (FIG. 2b) to +/−37° approximately for the third lens (FIG. 6b), these field widths corresponding to an involuntary astigmatism which is less than or equal to 0.5 dioptry. The astigmatism of the first lens for the ophthalmic vision (FIG. 2b) exceeds 2.0 dioptries at the periphery of the lens in the horizontal plane, whereas it is limited to less than 0.75 dioptry for the third lens (FIG. 6b). FIGS. 2c and 6c show that the invention also makes it possible to largely reduce the variations of the optical power for the additional vision: they are greater than 1.0 dioptry as an absolute value in the horizontal plane for the first lens (FIG. 2c), whereas they are less than 0.5 dioptry for the third lens (FIG. 6c). Finally, according to FIGS. 2d and 6d which relate to the astigmatism, the additional field of vision is increased from +/−21° for the first lens produced without using the invention to +/−25° for the third lens produced using the invention. At the same time, the invention has made it possible to reduce the astigmatism in the horizontal plane at the periphery of the lens for the additional vision, from 2.0 dioptries (FIG. 2d) to 1.0 dioptry (FIG. 6d). Furthermore, the first and third lenses have values that are identical for the accommodative effort.

Figures 3A, 7A:
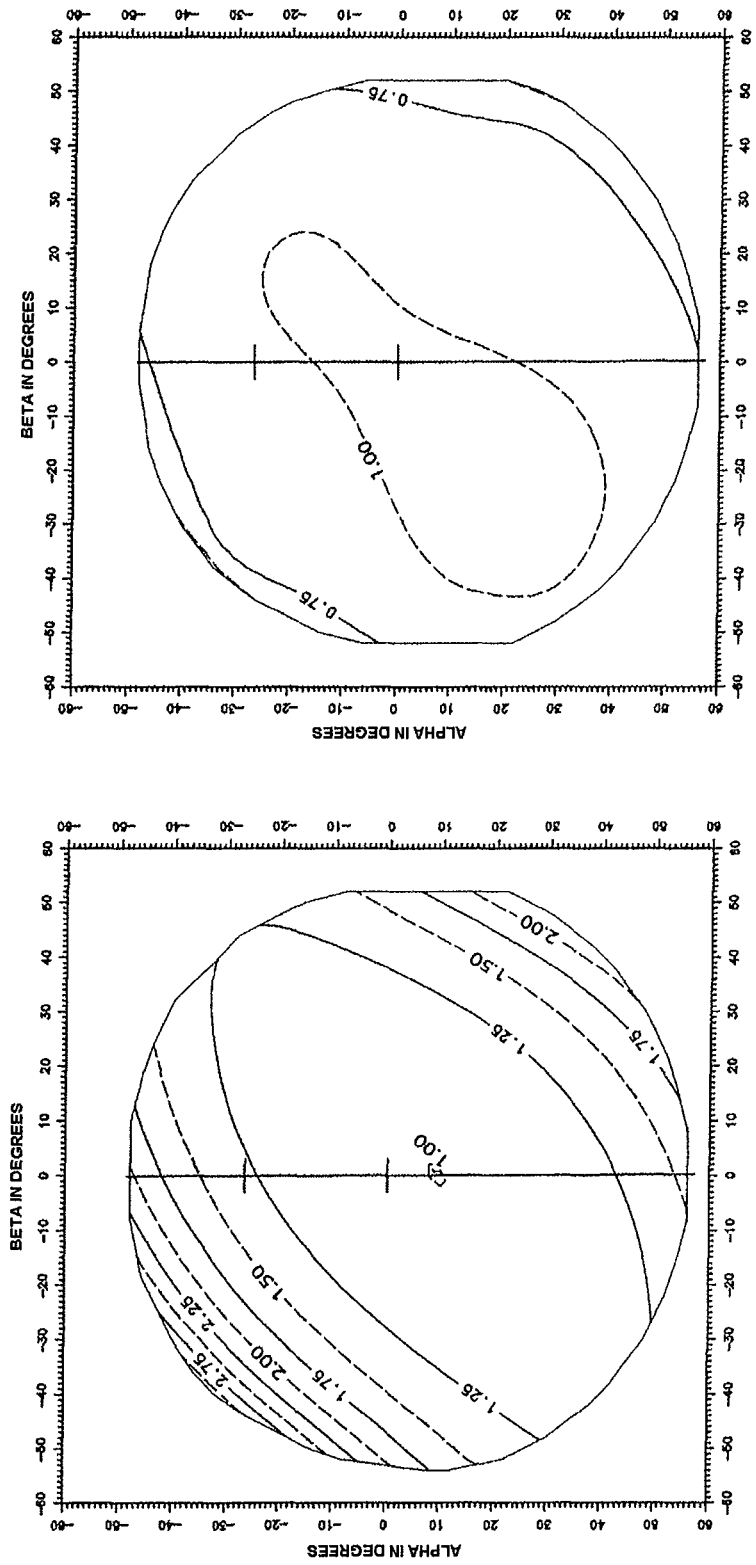
Figures 3C, 7C:
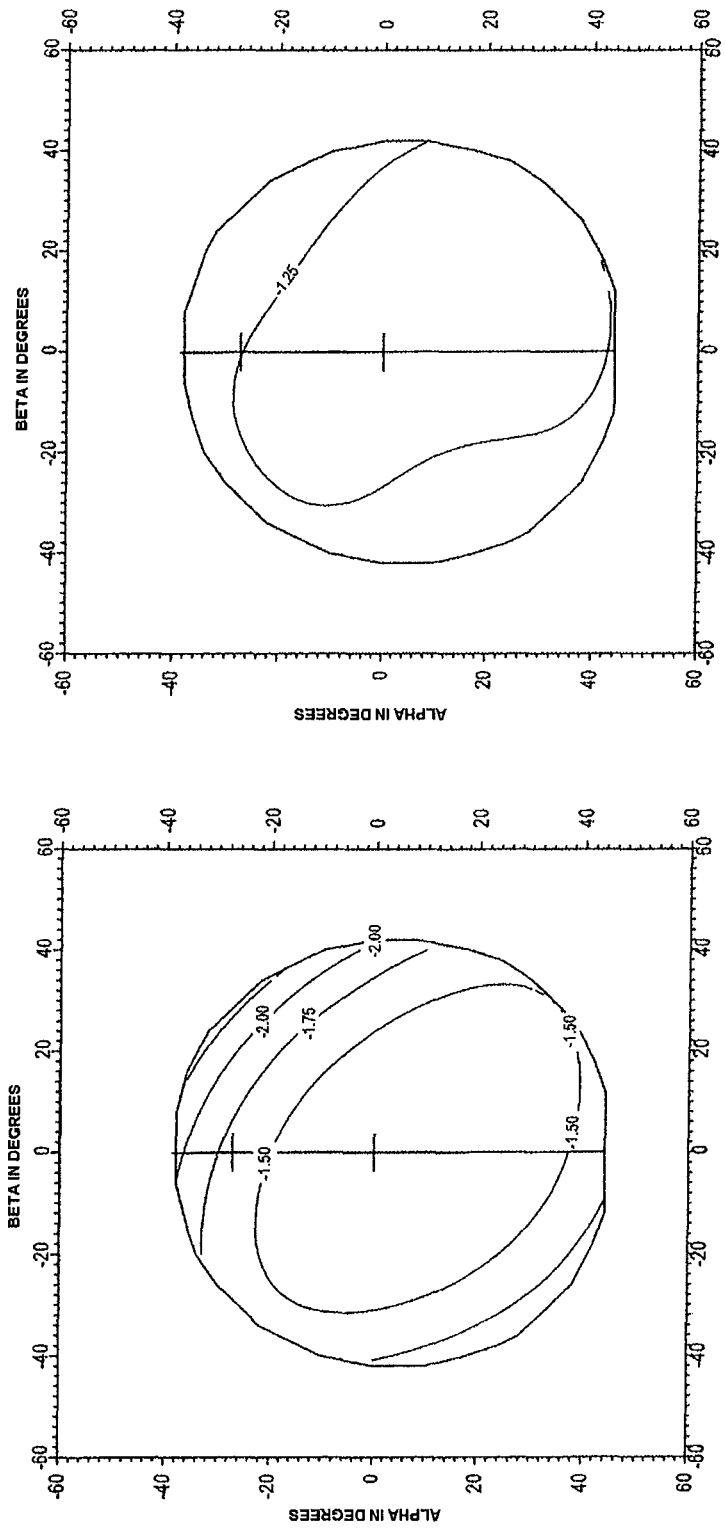
Figures 3D, 7D:
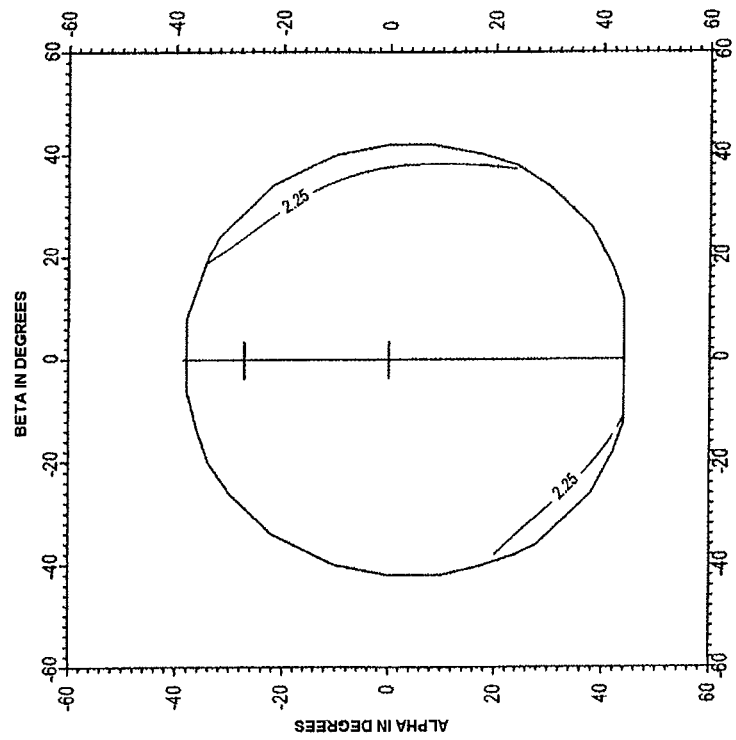

FIGS. 7a to 7d are maps of a fourth lens produced according to the invention, which corresponds to the same ophthalmic prescription as the second lens of FIGS. 3a to 3d. FIGS. 7a and 7b respectively relate to the average optical power and the astigmatism for the ophthalmic vision, and FIGS. 7c and 7d respectively relate to the average optical power and the astigmatism for the additional vision. These maps show that the invention has made it possible, for this prescription and for values of the accommodative effort which are still substantially identical, to increase the ophthalmic field of vision to the entire surface of the lens. The same applies for the additional vision whereas the latter is practically limited by the output window FS of the insert 2.

Thus, the invention makes it possible to increase the respective fields of both visions, ophthalmic and additional, in a significant proportion both for a myopia correction lens and for a hypermetropia correction lens. Furthermore, it makes it possible to reduce, for both visions, the variations of optical power and astigmatism which are present between the prescription point for this vision and the periphery of the lens.

Finally, it is understood that the invention can be adapted in various ways relative to the implementations described here in detail, while retaining at least some of the advantages cited. In particular, it can be applied regardless of the prescription of the wearer, and regardless of the shape of the insert which brings the light of the additional vision. Furthermore, the target hypothetical lenses that are used may be different from those defined on the basis of the Tscherning basic values.

It is also recalled that a spectacle lens according to the invention can be adapted to provide the wearer with the ophthalmic vision and the additional vision simultaneously or alternately. When both visions are available simultaneously for the wearer, the invention makes it possible for the respective images of both ophthalmic and additional visions to both appear clear for the wearer in an apparent superposition of these images. When the two visions are available alternately for the wearer, the invention enables the wearer to switch from one to the other without any intermediate modification of his ocular accommodation. The invention then makes it possible to eliminate an ocular accommodation fatigue, and increase the comfort of the user and the frequency with which he can switch from the ophthalmic vision to the additional vision and vice versa.

The invention claimed is:

1. A method for producing a spectacle lens configured to provide a wearer of the lens with an ophthalmic vision and an additional vision, said lens including: a front face, a rear face, a refringent medium, and an insert, said rear face being configured to face an eye of a wearer for a position of use of said lens; the refringent medium being situated between the front and rear faces; the insert being situated within the refringent medium and configured to deliver, between the front and rear faces of the lens, through an output window of said insert toward the eye of the wearer, light forming an additional image visible to the wearer in the position of use of the lens; the ophthalmic vision corresponding to an image formed by light having passed in succession through the front face, a front portion of the refringent medium situated on a front side of the insert, the insert or an intermediate portion of the refringent medium situated outside a peripheral edge of said insert, a rear portion of the refringent medium situated on a rear side of the insert, and the rear face of the lens; and the additional vision corresponding to the additional image formed by said light passing through the insert, the rear portion of the refringent medium and the rear face of the lens; the method comprising:

obtaining an ophthalmic prescription for the wearer of the lens;

determining an additional prescription for said additional vision from the ophthalmic prescription and from a position of the additional image;

determining a curvature value for the rear face of the lens corresponding to the additional prescription, at an additional prescription point;

determining a curvature value for the front face of the lens at an ophthalmic prescription point, according to the ophthalmic prescription and the curvature value of the rear face of the lens;

calculating additional curvature values for the rear face of the lens outside the additional prescription point, at least inside an area of said rear face corresponding to the output window of the insert, designed so that said rear face area produces a correction for the additional vision which corresponds to the additional prescription;

calculating additional curvature values for the front face of the lens outside of the ophthalmic prescription point, designed so that said lens produces a correction for the ophthalmic vision which corresponds to the ophthalmic prescription, when the rear face of the lens has the additional curvature values calculated for the rear face; and producing the spectacle lens with the additional curvature values calculated for the front and rear faces.

2. The method as claimed in claim 1, wherein determining the additional prescription includes determining the additional prescription so that an accommodative effort on the part of the wearer is less than 2.25 dioptries as an absolute value, when said wearer switches from the ophthalmic vision through the spectacle lens to the additional vision.

3. The method as claimed in claim 1, wherein calculating the additional curvature values for the rear face of the spectacle lens include calculating the additional curvature values for the rear face by digital optimization.

4. The method as claimed in claim 3, wherein calculating the additional curvature values for the rear face comprises:

defining a first target hypothetical lens including:
  the refringent medium;
  a hypothetical front face having a first basic value at the additional prescription point, said first basic value being selected to reduce optical aberrations of the additional vision relative to the additional prescription; and
  a hypothetical rear face designed to produce, at the additional prescription point, in combination with the hypothetical front face of said first target hypothetical lens, a correction of the additional vision conforming to said additional prescription; and optimizing a first test hypothetical lens comprising:
  a hypothetical front face defined according to the insert;
  the insert;
  the rear portion of the refringent material; and
  a variable complex rear face, wherein the first test hypothetical lens and the first target hypothetical lens have optical characteristics substantially equal to at least the area corresponding to the output window of the insert, and the values for the rear face of the spectacle lens are obtained from the rear face of the first test hypothetical lens on completion of optimizing the first test hypothetical lens.

5. The method as claimed in claim 4, wherein the rear face of the first test hypothetical lens initially has, before optimizing the first test hypothetical lens, the curvature value determined for the rear face of the lens at any point of said rear face of the lens at least within the area corresponding to the output window of the insert.

6. The method as claimed in claim 4, also comprising adjusting the curvature values of the rear face of the spectacle lens in order to compensate for a modification of a distance between the front and rear faces of said spectacle lens.

7. The method as claimed in claim 4, wherein the values of the rear face of the spectacle lens are obtained from the rear face of the first test hypothetical lens only within the area of said rear face corresponding to the output window of the insert, and wherein calculating the additional curvature values for the rear face of the lens comprises:

defining a second target hypothetical lens including:
the refringent medium;
a hypothetical front face having a second basic value at the ophthalmic prescription point, said second basic value being selected to reduce optical aberrations of the ophthalmic vision relative to the ophthalmic prescription; and
a hypothetical rear face designed to produce, at the ophthalmic prescription point, in combination with the hypothetical front face of said second target hypothetical lens, a correction of the ophthalmic vision conforming to said ophthalmic prescription; and
outside the area of the rear face corresponding to the output window of the insert, optimizing a second test hypothetical lens comprising:
a hypothetical front face having the curvature value determined for the front face of the lens at the ophthalmic prescription point;
the front portion of the refringent medium;
the intermediate portion of the refringent medium or the insert;
the rear portion of the refringent medium; and
a variable complex rear face,
wherein the second test hypothetical lens and the second target hypothetical lens have substantially equal optical characteristics outside said area, and
the values of the rear face of the spectacle lens outside the area of said rear face corresponding to the output window of the insert are obtained from the rear face of the second test hypothetical lens outside said area on completion of optimizing the second test hypothetical lens.

8. The method as claimed in claim 7, wherein the rear face of the second test hypothetical lens initially has, before optimizing the second test hypothetical lens outside the area corresponding to the output window of the insert, uniform curvature values determined so that said second test hypothetical lens produces, at the ophthalmic prescription point, a correction for the ophthalmic vision which corresponds to the ophthalmic prescription.

9. The method as claimed in claim 1, wherein calculating the additional curvature values of the front face of the spectacle lens includes calculating the additional curvature values of the front face of the spectacle lens by digital optimization.

10. The method as claimed in claim 9, wherein calculating the additional curvature values of the front face of the spectacle lens includes:
defining a target hypothetical lens that includes:
the refringent medium;
a hypothetical front face having a basic value at the ophthalmic prescription point, said basic value being selected to reduce optical aberrations of the ophthalmic vision relative to the ophthalmic prescription; and
a hypothetical rear face designed to produce, at the ophthalmic prescription point, in combination with the hypothetical front face of said target hypothetical lens, a correction of the ophthalmic vision conforming to said ophthalmic prescription; and
optimizing a test hypothetical lens comprising:
a variable complex front face;
the front portion of the refringent medium;
the intermediate portion of the refringent medium or the insert;
the rear portion of the refringent medium; and
a rear face corresponding to the values calculated for the rear face of the lens outside the additional prescription point,
wherein the test hypothetical lens and the target hypothetical lens have substantially equal optical characteristics, and
the values of the front face of the spectacle lens are obtained from the front face of the test hypothetical lens on completion of optimizing the test hypothetical lens.

11. The method as claimed in claim 10, according to which the front face of the test hypothetical lens initially has, before optimizing the test hypothetical lens, the curvature value determined for the front face of the lens at the ophthalmic prescription point, at any point of said front face.

12. The method as claimed in claim 10, also comprising adjusting the values of the front face of the spectacle lens, in order to compensate for a modification of a distance between the front and rear faces of said spectacle lens.

13. The method as claimed in claim 12, wherein the modification of the distance between the front and rear faces is determined so that a predetermined margin separates the peripheral edge of the insert relative to the front face of the spectacle lens.

* * * * *